United States Patent [19]

Takahashi et al.

[11] Patent Number: 4,746,569

[45] Date of Patent: May 24, 1988

[54] LONGITUDINAL MAGNETIC COATED RECORDING MEDIUM

[75] Inventors: Jun Takahashi, Zama; Shigeru Fukushima, Tokyo; Toshikatu Narumi, Kawasaki; Ken-ichi Itoh, Yamato; Seiya Ogawa, Kawasaki, all of Japan

[73] Assignee: Fujitsu Limited, Kawasaki, Japan

[21] Appl. No.: 863,039

[22] Filed: May 14, 1986

[30] Foreign Application Priority Data

| May 20, 1985 | [JP] | Japan | 60-107635 |
| Sep. 3, 1985 | [JP] | Japan | 60-194076 |
| Apr. 7, 1986 | [JP] | Japan | 61-078159 |
| Apr. 7, 1986 | [JP] | Japan | 61-078160 |
| Apr. 8, 1986 | [JP] | Japan | 61-079170 |
| Apr. 9, 1986 | [JP] | Japan | 61-080064 |
| Apr. 9, 1986 | [JP] | Japan | 61-080065 |

[51] Int. Cl.$^4$ .............................................. G11B 5/70
[52] U.S. Cl. .................................. 428/323; 427/128; 428/694; 428/900
[58] Field of Search ................... 428/323, 694, 900; 427/122

[56] References Cited

U.S. PATENT DOCUMENTS

| 4,425,401 | 1/1984 | Ido et al. | 428/694 |
| 4,451,535 | 5/1984 | Pingaud et al. | 428/694 |
| 4,486,496 | 12/1984 | Dezawa et al. | 427/128 |
| 4,552,808 | 11/1985 | Fujiyama et al. | 427/128 |
| 4,565,726 | 1/1986 | Ouguchi et al. | 428/900 |
| 4,585,697 | 4/1986 | Kato et al. | 427/128 |

FOREIGN PATENT DOCUMENTS

| 52-141612 | 11/1977 | Japan . |
| 54-009905 | 1/1979 | Japan . |
| 57-212623 | 12/1982 | Japan . |
| 58-006526 | 1/1983 | Japan . |
| 59-129933 | 7/1984 | Japan . |

Primary Examiner—Paul J. Thibodeau
Attorney, Agent, or Firm—Staas & Halsey

[57] ABSTRACT

A longitudinal magnetic coated recording medium comprises at least plane magnetic particles each having an easy magnetization axis perpendicular to the major surface thereof, preferably mixed with other particles, and dispersed in a magnetic film formed on a nonmagnetic substrate, having a orientation angle of $-30°$ to $+30°$. A process for producing such a recording medium comprises the step of orienting the plane magnetic particles by applying at least a magnetic field approximately in parallel to the surface of the magnetic film.

10 Claims, 12 Drawing Sheets

LONGITUDINAL MAGNETIC COATED RECORDING MEDIUM

BACKGROUND OF THE INVENTION

1. Field of the Invention

The present invention relates to a so-called longitudinal magnetic coated recording medium.

2. Description of the Prior Art

A magnetic recording medium comprises a magnetic film which is formed on a nonmagnetic substrate and contains magnetic particles dispersed therein. The easy magnetization axis of the magnetic particles may be oriented approximately either in parallel to or perpendicular to the surface of the magnetic film. Acicular magnetic particles e.g., $\gamma$-Fe$_2$O$_3$, are commonly used for dispersion in a magnetic film. Such magnetic particles have an easy magnetization axis in the direction of its longitudinal axis, and tend easily to orient in a direction in parallel to the surface of the magnetic film. Thus, their magnetic orientation is parallel to the surface of the magnetic film, hereinafter referred to as longitudinal orientation.

Figure 1:
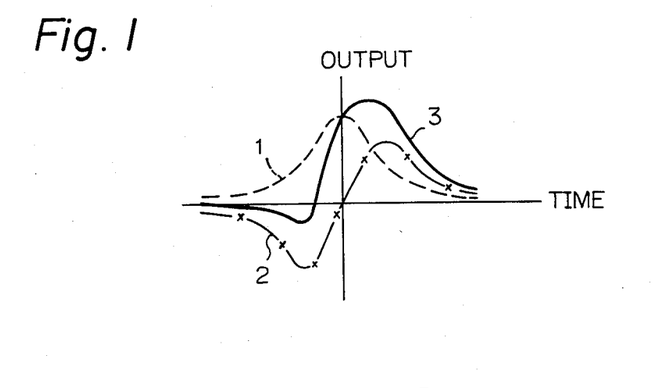
FIG. 1 is a diagram of output waves detected by a ring head.
Figure 2:
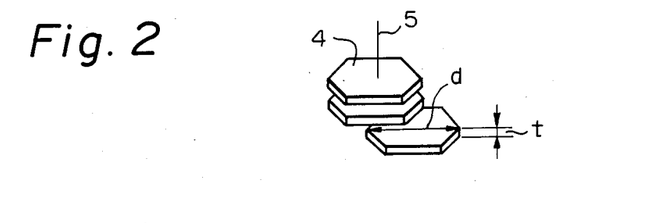
FIG. 2 is a perspective view of a plane magnetic particle having an easy magnetization axis perpendicular to the major surface of the plane.

When information is written in and read out of a longitudinal magnetic film by means of a ring head, the magnetic fluxes which a detecting ring head cuts are components almost parallel to the surface of the magnetic film, and the detected magnetic fluxes exhibit a normal distribution as shown by a broken line 1 in FIG. 1. On the other hand, when plane magnetic particles 4 each having an easy magnetization axis 5 perpendicular to the major surface thereof, e.g., barium ferrite, such as BaFe$_{12}$O$_{19}$, Ba$_2$Me$_2$Fe$_{12}$O$_{22}$, Ba$_3$Me$_2$Fe$_{24}$O$_{41}$, Ba$_3$Co$_{1.9}$-2Fe$_{0.08}$Fe$_{24}$O$_{41}$ as shown in FIG. 2, are dispersed in a magnetic film, the major surface of the plane magnetic particles tends to be arranged in parallel to the surface of an aluminum or polyester substrate particularly when the substrate is a disc which rotates during spin-coating. In this case, the easy magnetization axis 5 of the plane magnetic particle 4 is oriented perpendicular to the surface of the magnetic film.

In such a case, the detected fluxes exhibit an abnormal asymmetric distribution, as shown by a one-point broken line 2 in FIG. 1. Furthermore, a practical magnetic recording medium, which contains perpendicular barium ferrite particles, has a certain amount of longitudinal magnetic components. Thus, the broken line 1 and one-point broken line 2 are synthesized, and thereby the detected curve is deformed as shown by a solid line 3 in FIG. 1, and the peak of the detected flux is dislocated from the original point. It is necessary to pass the detected signal through a correction circuit which comprises a delay circuit, an attenuator, etc., prior to the writing and reading of information. In addition, the output and practical recoding density are inevitably low.

The hexagonal crystal platelets with easy magnetization axes normal to their planes such as barium ferrite BaFe$_{12}$O$_{19}$ etc are recognized to be effective for improving the recording density. However, barium ferrite is not practically used to produce a perpendicular recording medium due to the above-mentioned defects. Furthermore a longitudinal magnetic coated recording medium comprising barium ferrite is not realized, because it is difficult to form a longitudinal magnetic film therefrom.

Wada et al to Toshiba Denki K.K. disclose in Japanese Unexamined Patent Publication No. 57-212623 a magnetic recording medium which contains barium ferrite type magnetic particles with an average size of at most 0.3 $\mu$m in an amount of at least 50% by weight of the total magnetic particles, and $\gamma$-Fe$_2$O$_3$ type or cobalt type magnetic particles with an average size of at most 0.4 $\mu$m. However, Wada et al do not teach or suggest to apply a magnetic field prior to drying the magnetic paint. Kishimoto et al to Hitachi Maxell disclose in Japanese Unexamined Patent Publication No. 59-129933 a magnetic recording medium which contains barium ferrite magnetic particles having an easy magnetization axis perpendicular to the major surface thereof and other magnetic particles having an isometric magnetic axis. However, Kishimoto et al teach to apply solely a magnetic field perpendicular to the surface of the film base, thereby forming a perpendicular magnetic coated recording medium.

Taniguchi to Hitachi Maxell K.K. discloses in Japanese Unexamined Patent Publication No. 52-141612 a process for producing a magnetic recording medium wherein the surface of a substrate is coated with a magnetic paint, and passed through a magnetic field which arranges the magnetic particles, e.g., $\gamma$-Fe$_2$O$_3$, dispersed in the magnetic paint in parallel to the running direction of the substrate, and then the paint is dried. However, Taniguchi does not refer to a plane magnetic particles having an easy magnetization axis perpendicular to the major surface thereof.

Ishida et al to Fujitsu K.K. disclose in Japanese Unexamined Patent Publication No. 54-9905 a process for producing a magnetic recording disc, comprising the steps of: forming a magnetic film containing isometric magnetic particles, i.e., $\gamma$-Fe$_2$O$_3$, on the disc, applying a magnetic field perpendicular to the surface of the disc, and then applying an intrafacially orienting magnetic field parallel to the running direction of the disc. However, Ishida et al do not teach or suggest to apply a longitudinal magnetic field solely or alternate with a perpendicular magnetic field to a plane magnetic powder having an easy magnetization axis perpendicular to the major surface thereof.

Yokoyama et al to Toshiba Denki K.K. disclose in Japanese Unexamined Patent Publication No. 58-6526 a magnetic recording medium produced by painting a resinous compound comprising plane magnetic particles each having an easy magnetization axis perpendicular to the major surface of the particle, e.g., hexagonal ferrite crystals, with thickness of at most 0.2 $\mu$m, and the ratio of diametric size to thickness of at least 2, the particles being magnetically arranged in the moving direction of a magnetic head. However, Yokoyama et al do not teach the process whereby the plane magnetic particles are oriented, except that a magnetic field of 2 kOe is applied to a polyethylene film coated with the magnetic resin and calendered to form a recording tape having a ratio of residual magnetization to saturation magnetization of 0.9. Yokoyama et al do not refer to the orientation angle, which the inventors originally defined as an angle where the ratio of residual magnetization to saturation magnetization Mr/Ms is the largest. In addition, it seems that the ratio of residual magnetization to saturation magnetization is 0.9, which appears to be too large to be actually attained. Moreover, the magnetic medium with barium ferrite particles magnetically arranged in the moving direction of a magnetic head, inevitably contains many pinholes, and, therefore, we belive it can not be put into practical use as it is.

SUMMARY OF THE INVENTION

It is an object of the present invention to provide a magnetic recording medium which dispenses with the correction of an output wave.

It is another object of the present invention to provide a magnetic recording medium which exhibits a high recording characteristic, i.e., a high value in the product of output and recording density.

It is still another object of the present invention to provide a magnetic recording medium which exhibits reduced noise.

It is yet another object of the present invention to provide a process for producing a longitudinal magnetic coated recording medium which exhibits the advantages set forth above.

Barium ferrite and strontium ferrite are typical plane magnetic particles each having an easy magnetization axis 5 perpendicular to the major surface of the particle 4, as shown in FIG. 2. These particles are dispersed in a magnetic paint which is applied on a substrate. The ratio of diametric size to thickness of the plane magnetic particles may be more than 3.5, and the diametric size thereof may be in the range of 0.1 to 0.3 μm. In order to orient the easy magnetization axis of the plane magnetic particles in parallel to the surface of the magnetic film, it is necessary for the plane magnetic particles to be stood up-right by applying a magnetic field substantially in parallel to the surface of the magnetic film until the magnetic paint dries.

On the other hand, in order to distribute the plane magnetic particles uniformly throughout the magnetic film, it is preferable to alternately apply a magnetic field substantially in parallel to the surface of the magnetic film and another magnetic field perpendicular to the surface of the magnetic film prior to the drying step. Particularly in the case of a disc substrate, it is also advantageous to apply a magnetic field perpendicular to the surface of the magnetic film during the coating step, thereby avoiding an uneven accumulation of the plane magnetic particles.

In order to prevent the occurrence of pin holes on the surface of the magnetic film, it is advisable to prepare a magnetic paint in which other particles in an amount of 10 to 30% based on the total weight of the plane magnetic particles and the other particles are dispersed. The other particles set forth above may have a size in the range of from 0.05 to 0.4 μm, and be either magnetic particles such as $\gamma$-$Fe_2O_3$ and cobalt adsorbed $\gamma$-$Fe_2O_3$, or nonmagnetic particles such as $\alpha$-$Fe_2O_3$, $\alpha$-$Al_2O_3$ and $SiO_2$. It is convenient if a magnetic paint is prepared by blending a paint of the plane magnetic particles, and another paint of the other particles. Thus, each of the two kinds of particles are uniformly dispersed in the paint, respectively.

When the recording medium is a disc, which is spun-coated with a magnetic paint, it is advantageous to rotate the disc at a peripheral speed of at most 7 m/s, in order to avoid dropping of the plane magnetic particles, and, to rotate the disc in the orientation step at a speed lower than in the coating step.

The longitudinal magnetic coated recording medium according to the present invention essentially exhibits an output wave having a symmetrical normal distribution as shown by the broken line 1 in FIG. 1, contrary to the perpendicular magnetic coated recording medium, and thus, dispenses with wave correction. In addition, this longitudinal magnetic coated recording medium exhibits a low noise and a high output.

Although the recording density is somewhat lower than the conventional perpendicular recording medium, the practical recording density at which the peak-shift has a 10% deviation is higher than that of the perpendicular recording medium. The recording performance, defined as the product of output and recording density, is also higher than that of the perpendicular recording medium. We found that this recording characteristic exhibits a desirable value when the orientation angle is in the range of from $-30°$ to $+30°$. The orientation angle is defined herein as an angle at which the orientation degree, i.e., the ratio of residual magnetization to saturation magnetization Mr/Ms, is largest, and the orientation angle is determined as the angle between the film plane and easy axis of magnetization.

The longitudinal magnetic coated recording medium according to the present invention preferably exhibits the Mr/Ms ratio, in the direction parallel to the surface of the magnetic film, of at least 0.65, and/or the coercive forces $H_c$ in the direction parallel and perpendicular, respectively, to the surface of the magnetic film are approximately equal in the range of $\pm 5\%$.

Figure 15:
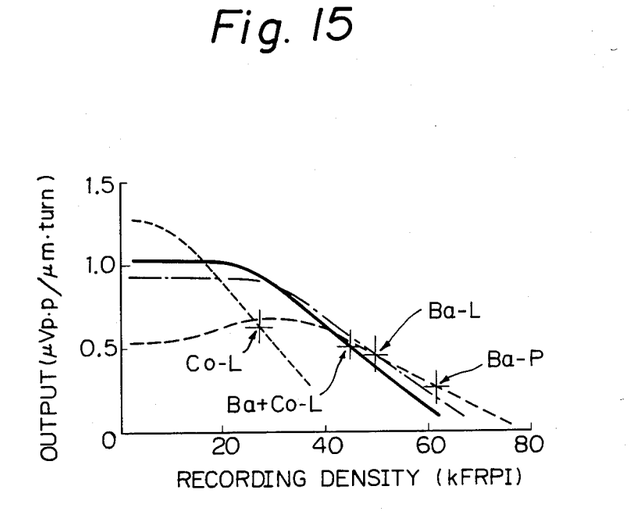
FIG. 15 is a graph showing the relationship between recording density and output.

As shown in FIG. 15, in the relationships between the recording density and output, referring to magnetic films containing longitudinally oriented barium ferrite (Ba—L) particles, longitudinally oriented 20% by weight of cobalt adsorbed $\gamma$-$Fe_2O_3$ mixed barium ferrite (Ba+Co—L) particles, longitudinally oriented cobalt adsorbed $\gamma$-$Fe_2O_3$ (Co—L) particles, and perpendicularly oriented barium ferrite (Ba—P) particles, respectively, that Ba+Co—L particles show a higher out put than those containing Ba—P and Ba—L particles, and the recording density thereof is much larger than that containing the longitudinally oriented Co—L particles.

The recording density, practical recording density at which the peak-shift has a 10% deviation, and the ratio of the latter to the former referring to the magnetic films set forth above are shown in Table 1, below.

TABLE 1

| Disk | $D_{50}$ (kFRPI) | $D_{PS.10}$ (kFRPI) | $D_{PS.10}/D_{50}$ (%) |
|---|---|---|---|
| Ba—P | 62 | 37 | 60 |
| Ba—L | 51 | 42 | 82 |
| Ba + Co—L | 46 | 42 | 91 |
| Co—L | 28 | 27 | 96 |

DESCRIPTION OF THE PREFERRED EMBODIMENTS

The present invention will be more readily understood by reference to the following detailed description taken in conjunction with the accompanying drawings.

The following examples refer to magnetic recording discs, and thus include parameters of centrifugal force, i.e., number of rotations which correspond to the circular speed of the disc.

EXAMPLE 1

Hexagonal plane barium ferrite particles 4 as shown in FIG. 2 having diametric size (d) of about 0.2 $\mu$m, and thickness (t) of about 0.02 $\mu$m were used as magnetic particles, and a magnetic paint was prepared according to the composition shown in Table 2.

TABLE 2

| Composition of Magnetic Paint | |
|---|---|
| Barium ferrite | 55 (parts by weight) |
| Epoxy resin | 30 |
| Phenolic resin | 10 |
| Acrylic resin | 5 |
| Thinner | 420 |
| ( Xylene:Toluene:Cellulose Acetate  3      3         1 ) | |

Figure 3:
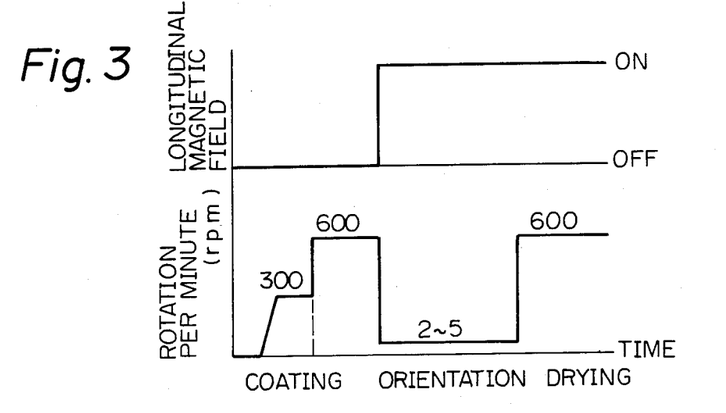
FIG. 3 is a diagram of the process for producing a longitudinal magnetic coated recording disc.

An aluminum disc 20.3 cm in diameter was spun-coated with the magnetic paint at 300 rpm and, thereafter, excess magnetic paint was flown off at 600 rpm which corresponds to about 6.5 m/s peripheral speed. Then, the rotation was slowed to 2 to 5 rpm as shown in FIG. 3, and this slow rotation maintained for about one minute, in order to prevent the plane surface of the particles from lying parallel to the surface of the magnetic film due to the centrifugal force. During the slow rotation, a 4 kOe longitudinal magnetic field was applied in parallel to the surface of the magnetic film. After the one minute period set forth above had elapsed, the rotation was raised again to 600 rpm, while application of the longitudinal magnetic field was maintained. Thus, the easy magnetization axis of the plane magnetic particles was oriented in parallel to the surface of the magnetic film, and the magnetic film was dried up, thereby forming a so-called longitudinal magnetic film about 0.5 $\mu$m in thickness.

Thus produced magnetic recording disc was tested by means of an Mn—Zn ring-head of 0.2 $\mu$m gap length. The write and read characteristics, i.e., output, recording density, recording density at ±10% peak-shift, and overwrite at 15/30 kFRPI with the same current of 35 mA were determined, as shown in column (A) of Table 3.

Corresponding data obtained from a conventional perpendicular magnetic coated recording disc, which was produced by a process similar to that set forth above except for applying a magnetic field perpendicular to the surface of the magnetic film, are shown in column (B) of Table 3.

TABLE 3

| | (A) Longitudinal | (B) Perpendicular |
|---|---|---|
| Output (mV) | 0.82 | 0.45 |
| Recording Density D$_{50}$ (kFRPI) | 55 | 60 |
| Recording Density at ±10% Peak-shift D$_{ps.10}$ (kFRPI) | 42 | 37 |
| Overwrite (dB) | −40 | −20 |

Thus a longitudinal magnetic coated recording disc exhibits a much higher output and a higher recording density after calibration of peak-shift and a better overwrite characteristic than those of the perpendicular magnetic coated recording disc.

Figure 4A:
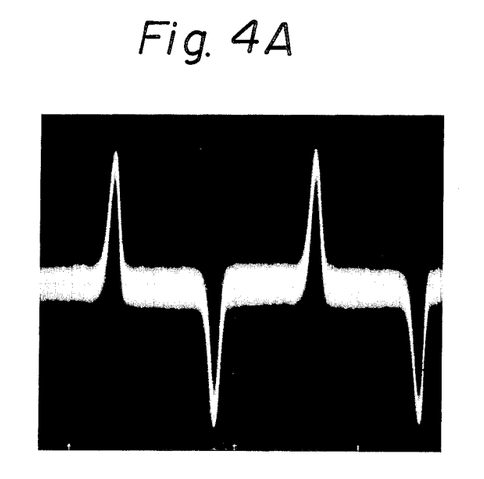
FIG. 4(A) is an oscillograph of an output wave of a longitudinal magnetic coated recording disc.
Figure 4B:
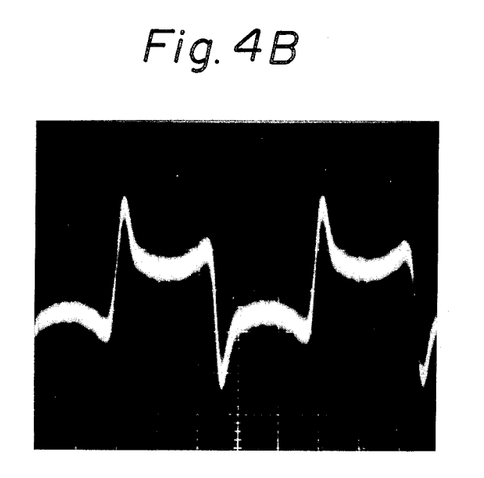
FIG. 4(B) is an oscillograph of an output wave of a perpendicular magnetic coated recording disc.

FIGS. 4(A) and (B) are oscillograph diagrams of the output of a magnetic recording disc detected by means of a ring head, respectively. The curve (A) is obtained by a longitudinal magnetic coated recording disc, and exhibits a symmetrical curve. Contrary to this, a conventional perpendicular magnetic coated recording disc exhibits an asymmetric curve (B).

EXAMPLE 2

Figure 5A:
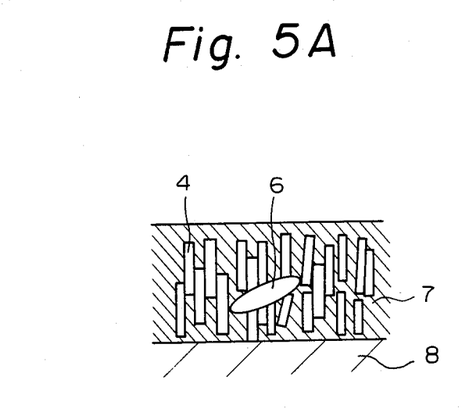
FIG. 5(A) is a sectional view of a film containing a cobalt adsorbed $\gamma$-$Fe_2O_3$ filler blended with barium ferrite.
Figure 5B:
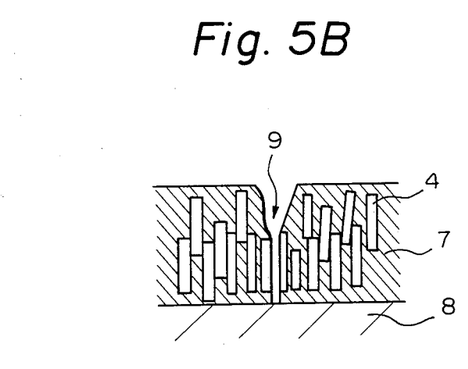
FIG. 5(B) is a sectional view of a film containing barium ferrite alone.

Hexagonal plane barium ferrite particles similar to those used in Example 1, were mixed with acicular cobalt absorbed $\gamma$-Fe$_2$O$_3$ filler particles 6, as shown in FIG. 5 having a mean size of 0.3 to 0.4 $\mu$m in a weight ratio of 4:1, and a magnetic paint was prepared according to the composition shown in Table 4.

TABLE 4

| Composition of Magnetic Paint | |
|---|---|
| Barium ferrite | 44 (parts by weight) |
| Cobalt $\gamma$-Fe$_2$O$_3$ | 11 |
| Epoxy resin | 30 |
| Phenolic resin | 10 |
| Acrylic resin | 5 |
| Thinner | 420 |
| ( Xylene:Toluene:Cellulose Acetate  3      3         1 ) | |

Figure 6A:
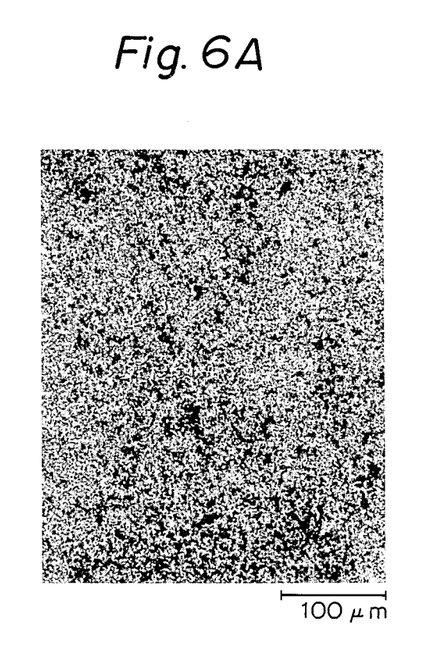
FIG. 6(A) is a microscopic photograph of the surface of a longitudinal magnetic coated recording disc, in which the magnetic film contains a cobalt adsorbed $\gamma$-Fe$_2$O$_3$ filler.
Figure 6B:
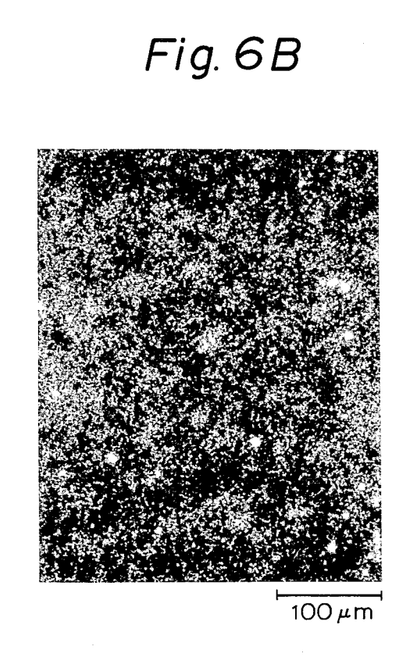
FIG. 6(B) is a microscopic photograph of the surface of a longitudinal magnetic coated recording disc, in which the magnetic film contains barium ferrite alone.

The process of spin-coating the magnetic paint, orientation of the barium ferrite particles, and drying the magnetic paint was carried out in a manner similar to those of Example 1. A magnetic film 7 formed on the disc 8 as shown in FIG. 5(A) exhibits a uniform surface structure under a microscope as shown in FIG. 6(A). Contrary to this, the magnetic recording disc obtained in Example 1 exhibits pin-holes 9, as shown in FIGS. 5(B) and 6(B) on the surface, which cause the generation of noise. Thus, the magnetic film 7 eliminates the pin-holes 9 where the plane magnetic particles 4 are not densely arranged.

This magnetic recording disc was tested as follows. A 10 kOe magnetic field was applied parallel to the surface of the disc, and the ratio of residual magnetization to saturation magnetization in the longitudinal direction $Mr/Ms\|$ was measured by means of a vibrated sample magnetic meter. The disc rotated at a speed of 20 m/s, and the recording density was determined by means of a Mn—Zn ring head having a gap length of 0.3 μm, and noise was integrated in the region of up to 10 MHz after DC erasing. These characteristic values are shown in column (A) in Table 5, and those obtained by the disc of Example 1 are shown in column (B) in Table 5.

TABLE 5

|  | (A) | (B) |
| --- | --- | --- |
| Degree of Orientation (Mr/Ms//) | 0.70 | 0.72 |
| Recording Density $D_{50}$ (kFRPI) | 53 | 56 |
| Noise, 10 MHz band (μVrms) | 6.5 | 13 |

Figure 7:
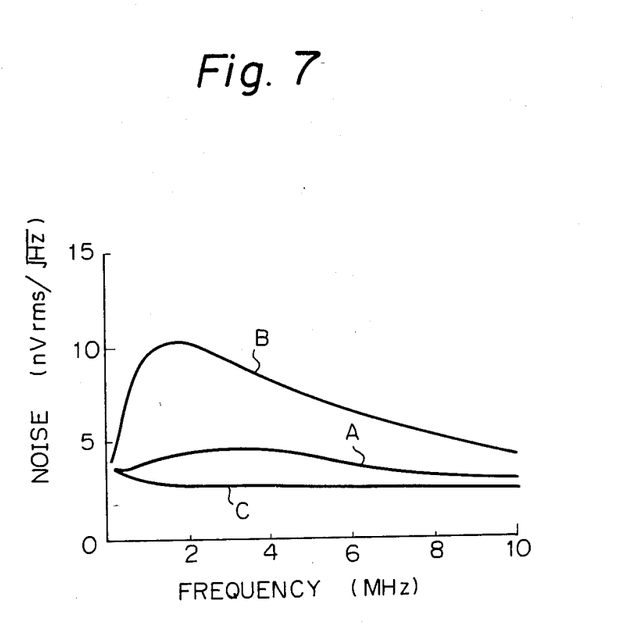
FIG. 7 is a graph showing the relationship between the frequency and noise of longitudinal and perpendicular magnetic coated recording discs.

The noise is reduced to half of that obtained by the magnetic recording disc of Example 1 as shown by curve (A) in FIG. 7, as compared with curve (B) which is obtained by a magnetic recording disc according to Example 1. In the diagram, curve (C) represents amplifier noise.

EXAMPLE 3

Hexagonal plane barium ferrite particles having a diametric size of about 0.2 μm and a thickness of about 0.01 μm were mixed with nonmagnetic $\alpha$-$Fe_2O_3$ particles having a mean size of about 0.3 to 0.4 μm in a weight ratio of 4:1, and a magnetic paint was prepared according to the composition shown in Table 3, except for replacing cobalt absorbed $\gamma$-$Fe_2O_3$ with $\alpha$-$Fe_2O_3$. A longitudinal magnetic coated recording disc was produced similar to Example 2, and the obtained recording properties were similar to those of Example 2.

EXAMPLE 4

Hexagonal barium ferrite particles having a diametric size of about 0.2 μm and a thickness of about 0.02 μm was mixed with other components to prepare a paint of the composition shown in Table 5(A). A filler paint was prepared using cobalt adsorbed $\gamma$-$Fe_2O_3$ particles having a mean size of at most 0.2 μm, according to the composition shown in Table 6(B).

TABLE 6

|  | (parts by weight) | |
| --- | --- | --- |
|  | (A) | (B) |
| Barium ferrite | 38 | — |
| Cobalt $\gamma$-$Fe_2O_3$ | — | 17 |
| Epoxy resin | 25 | 5 |
| Phenolic resin | 5 | 5 |
| Acrylic resin | — | 5 |
| Toluene | 115 | 35 |
| Xylene | 115 | 35 |
| Cellosolve acetate | 40 | 10 |

These paints were blended in a sand grinder for 3 hours, and then the same amount of the two paints was mixed and blended again in a sand grinder for 3 hours, whereby a magnetic paint having a viscosity of 0.9 poise was prepared. Then, a longitudinal magnetic coated recording disc was produced similar to the process of Example 1.

Using a ring head having a gap length of 0.2 μm, noise was detected in the frequency range of up to 10 MHz. The noise was 4.5 μVrms.

Contrary to this, in the case the compounds shown in Tables 6(A) and (B) were previously mixed and blended for 6 hours, and thus the magnetic paint was prepared in one step. The noise was 5.5 μVrms.

EXAMPLE 5

A filler paint was prepared having a similar composition as shown in Table 6(B), except that cobalt absorbed $\gamma$-$Fe_2O_3$ was replaced with nonmagnetic $\alpha$-$Fe_2O_3$ having a mean size of 0.3 to 0.4 μm. The filler paint was blended with the paint obtained according to the composition shown in Table 6(A). Thus, a magnetic recording disc was produced similar to the process of Example 4. The noise was 6.2 μVrms, as compared with 8.0 μVrms from a disc in which the magnetic paint was prepared in one step.

EXAMPLE 6

A barium ferrite magnetic paint and an $\alpha$-$Fe_2O_3$ filler paint were prepared according to the compositions shown in Table 7(A), and 7(B), respectively.

TABLE 7

|  | (parts by weight) | |
| --- | --- | --- |
|  | (A) | (B) |
| Barium ferrite | 44 | — |
| $\alpha$-$Fe_2O_3$ | — | 11 |
| Epoxy resin | 25 | 5 |
| Phenolic resin | 5 | 5 |
| Acrylic resin | — | 5 |
| Toluene | 95 | 55 |
| Xylene | 95 | 55 |
| Cellosolve acetate | 35 | 15 | and were blended as in Example 4. Thus, a magnetic paint was prepared and a longitudinal magnetic coated recording disc was produced in a process similar to Example 4. The noise was 6.6 μVrms, as compared with 8.0 μVrms obtained by a disc, in which the magnetic paint was prepared in one step.

EXAMPLE 7

A barium ferrite paint and an $\alpha$-$Al_2O_3$ filler paint were prepared according to the compositions shown in Table 8(A) and (B), respectively.

TABLE 8

|  | (parts by weight) | |
| --- | --- | --- |
|  | (A) | (B) |
| Barium ferrite | 44 | — |
| $\alpha$-$Al_2O_3$ | — | 11 |
| Epoxy resin | 25 | 5 |
| Phenolic resin | 5 | 5 |
| Acrylic resin | — | 5 |
| Toluene | 105 | 45 |
| Xylene | 105 | 45 |
| Cellosolve acetate | 40 | 10 | and were blended as in Example 4.

Thus, a magnetic paint was prepared, and a longitudinal magnetic coated recording disc was produced in a process similar to Example 4. The noise was 6.6 μVrms, as compared with 8.0 μVrms obtained by a disc, in which the magnetic paint was prepared in one step.

EXAMPLE 8

Figure 8:
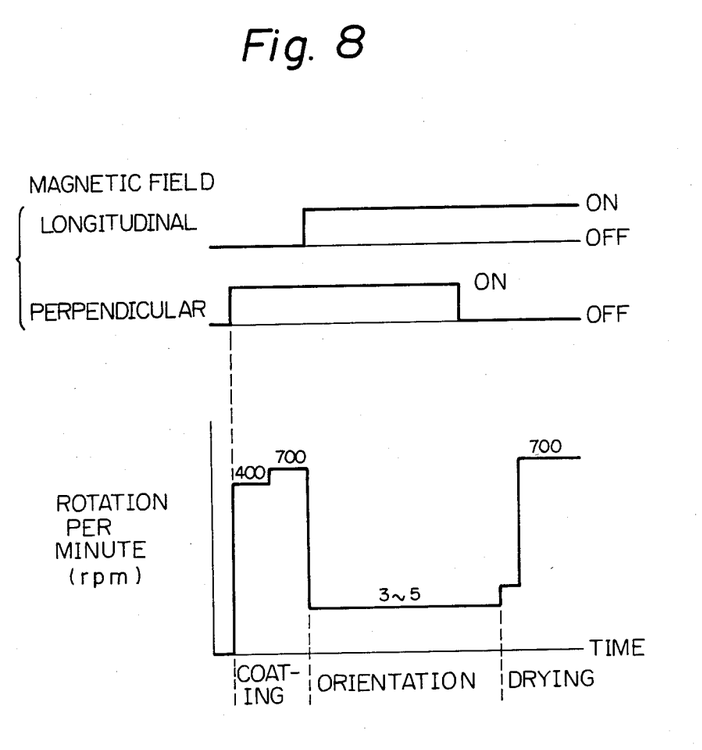
FIG. 8 is another diagram of a process for producing a longitudinal magnetic coated recording disc.

An aluminum disc of 20.3 cm diameter was spun-coated with the same magnetic paint prepared according to the composition of Example 1, and as shown in FIG. 8, the disc was rotated at 400 rpm, and thereafter at 700 rpm to flow off excess paint, and a magnetic field was applied perpendicular to the surface of the disc, thereby the plane particles of barium ferrite were uniformly distributed on the disc.

The rotation was slowed to 3~5 rpm, and magnetic fields longitudinal and perpendicular to the surface of the disc were alternately, respectively, applied for 5 minutes, whereby the orientation of the major surface of the plane particles was alternately changed to prevent mutual coagulation of the particles. Thereafter, the perpendicular magnetic field was cut and only the longitudinal magnetic field was applied, the rotation was again raised to 700 rpm, and the magnetic paint was dried.

The obtained magnetic recording disc exhibits a degree of longitudinal orientation Mr/Ms of 0.70 and a recording density of 53 kFRPI.

EXAMPLE 9

A magnetic paint of the composition shown in Table 4, Example 2 was applied on an aluminum disc 20.3 cm in diameter.

During the spin-coating, no magnetic field was applied to the disc which was rotated at 500 rpm. The orientation and drying steps were carried out as in Example 2. The obtained longitudinal magnetic coated disc exhibited the parameters shown in Table 8.

TABLE 9

| | |
|---|---|
| Degree of Longitudinal Orientation (Mr/MS//) | 0.69 |
| Recording Density $D_{50}$ (kFRPI) | 53 |
| Noise, 10 MHz band (μVrms) | 5 |
| S/N (d/B) | 34 |

EXAMPLE 10

Various longitudinal magnetic coated recording discs were produced as in Example 2, except that the rotation speed in the coating steps was changed in the range of 300 to 1500 rpm.

A 10 kOe magnetic field was applied at various angles from the surface of the magnetic film. The ring head had a gap length of 0.2 μm.

The ratio of residual magnetization to saturation magnetization Mr/Ms, i.e., degree of longitudinal orientation was determined for each disc.

Figure 9:
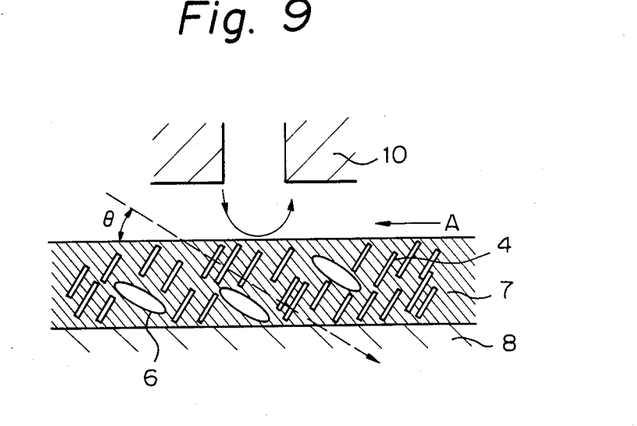
FIG. 9 is a sectional view of a magnetic film indicating the direction of orientation angle.

Among the angles the angle $\theta$, in which the value Mr/Ms is largest was defined as the orientation angle, and denominated minus in the case the orientation angle $\theta$ declines in the opposite direction in which the magnetic flux from the ring head 10 curves, as shown in FIG. 9. The output $e_0$ and recording density $D_{50}$ were detected by means of the ring head set forth above and their product was calculated for each disc. Their product values were plotted against the orientation angle in FIG. 10. The vertical axis is relatively graduated by setting the product of output $e_0$ and recording density.

Figure 10:
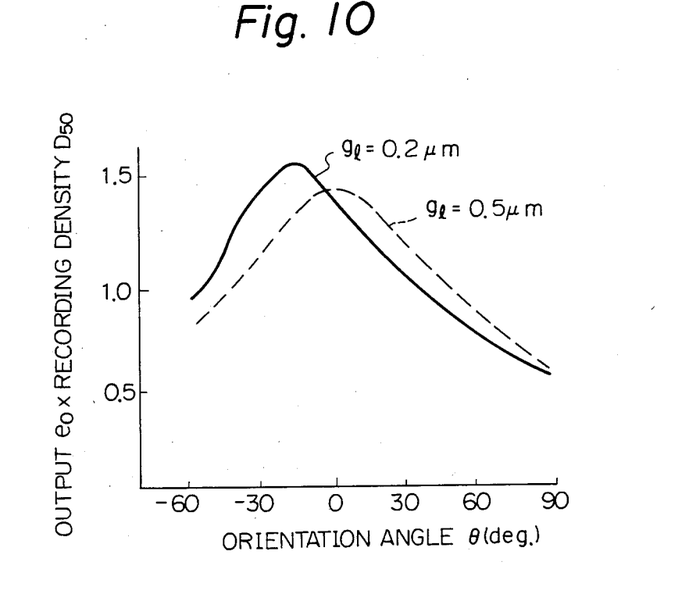
FIG. 10 is a graph showing the relationship between recording characteristic and orientation angle.

It was found that the desirable values of the product of output $e_0$ and recording density $D_{50}$ fall within the range of an orientation angle of from $-30°$ to $+30°$, as shown in FIG. 10.

The longitudinal magnetic coated recording disc produced by applying 600 rpm in Example 1 exhibited an orientation angle of 0°, when the orientation degree, recording density and output were detected similarly, except that a ring head having a gap length of 0.5 μm was used.

EXAMPLE 11

Figure 11:
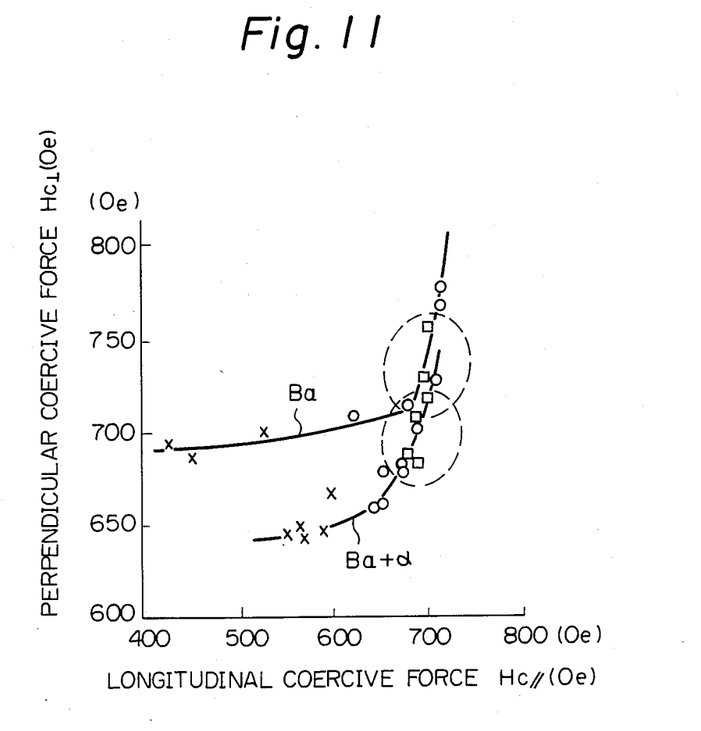
FIG. 11 is a graph showing the relationship between recording characteristic and longitudinal and perpendicular coercive forces.

Longitudinal magnetic coated recording discs were produced according to Examples 1 and 2 except for changing the rotation speed. The degree of orientation, and recording density $D_{50}$ were determined as in Example 2. The output $e_0$ and longitudinal and perpendicular coercive forces Hc were also determined. The product of output $e_0$ and recording density $D_{50}$ was calculated to obtain a recording characteristic value. FIG. 11 shows the relationship between longitudinal and perpendicular coercive forces Hc∥ and Hc⊥, and the recording characteristic values are marked as □, o and X, when the values are at least 50 mV kFRPI, 40 to 50 mV X kFRPI, and less than 40 mV X kFRPI, respectively. A Ba curve was obtained by barium ferrite discs, and a Ba+α curve was obtained by barium ferrite mixed with cobalt adsorbed γ-Fe$_2$O$_3$ discs.

Both curves exhibited □ marks in the area in which the longitudinal an perpendicular coercive forces Hc∥ and Hc⊥ are approximately equal to 700 Oe.

EXAMPLE 12

Figure 12:
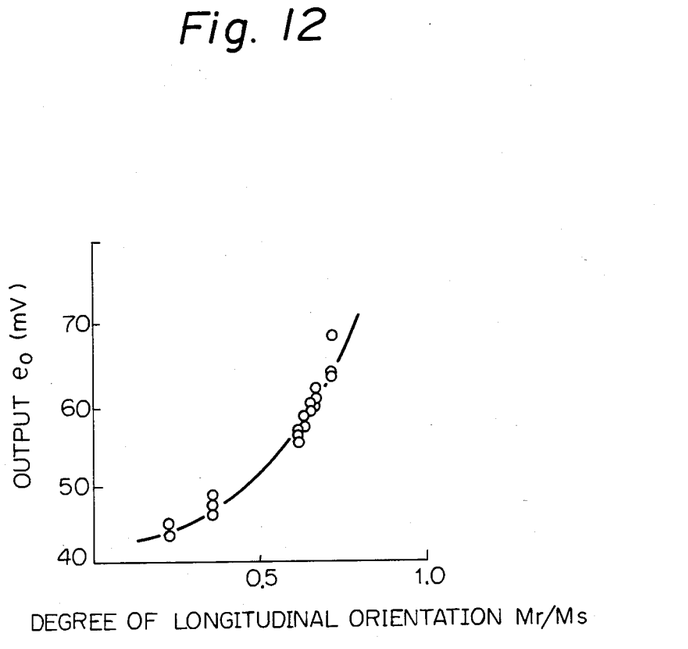
FIG. 12 is a graph showing the relationship between output and degree of longitudinal orientation.
Figure 13:
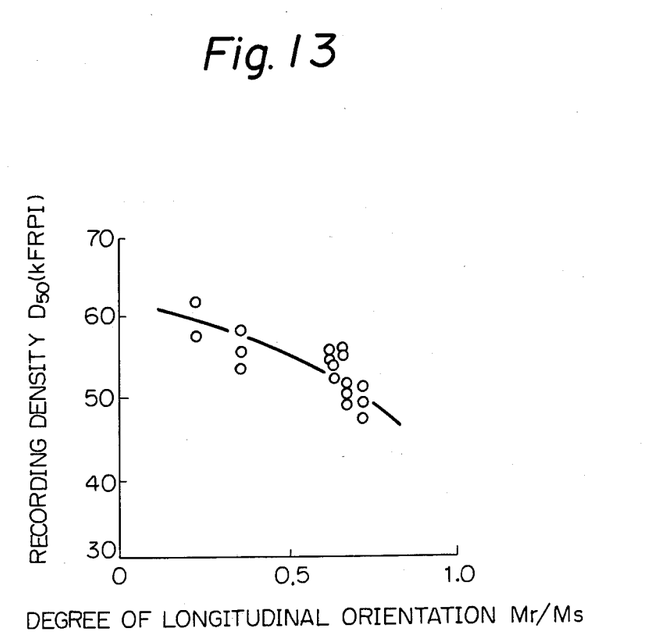
FIG. 13 is a graph showing the relationship between recording density and degree of longitudinal orientation.
Figure 14:
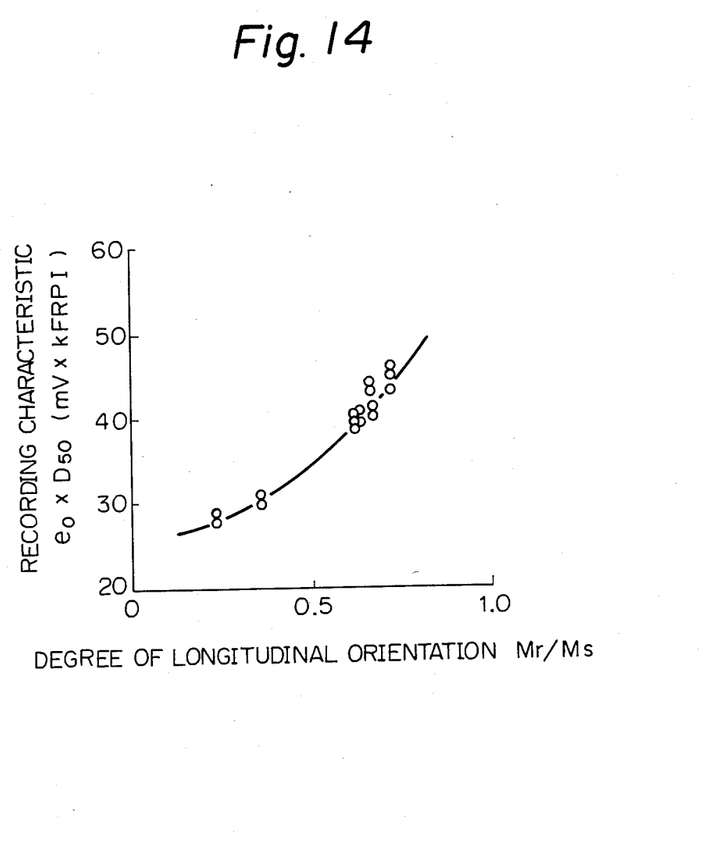
FIG. 14 is a graph showing the relationship between degree of longitudinal orientation and recording characteristic.

Longitudinal magnetic coated recording discs were produced according to Example 1, except for changing the rotation speed. The ratio of residual magnetization to saturation magnetization Mr/Ms in the longitudinal direction was determined as in Example 2. The output $e_0$ and recording density $D_{50}$ were determined by means of a ring head having a gap length of 0.2 μm, while the discs were rotated at a peripheral speed of 12.4 m/s. The output $e_0$ sharply increases, as shown in FIG. 12, and the recording density gradually decreases as shown in FIG. 13, with the increase in longitudinal degree of orientation. The product of output $e_0$ and recording density $D_{50}$ is 40 mV kFRPI, when the degree of longitudinal orientation is at least 0.65, as shown in FIG. 14.

We claim:

1. A longitudinal magnetic coated recording medium, comprising:
    a nonmagnetic substrate having a magnetic film formed thereon including a magnetic film plane; and
    plane magnetic particles, each having an easy magnetization axis perpendicular to a major surface thereof and dispersed in said magnetic film, the orientation angle of said particles being in the range of from $-30°$ to $+30°$, said orientation angle being determined by an angle where the ratio of residual magnetization to saturation magnetization Mr/Ms, is largest, and said orientation angle being defined as the angle between the magnetic film plane and said easy axis of magnetization.

2. A recording medium according to claim 1, wherein the ratio of residual magnetization to saturation magnetization Mr/Ms in a direction parallel to the surface of said magnetic film is at least 0.65.

3. A recording medium according to claim 1, characterized in that said magnetic film contains other particles mixed with said plane magnetic particles in an amount of 10 to 30% based on the total weight of said plane magnetic particles and said other particles.

4. A recording medium according to claim 1, characterized in that said plane magnetic particles are hexagonal crystals selected from the group consisting of barium ferrite and strontium ferrite.

5. A recording medium according to claim 3, characterized in that said other particles are magnetic particles different from said plane magnetic particles.

6. A recording medium according to claim 5, characterized in that said other magnetic particles are acicular $\gamma\text{-}Fe_2O_3$ or cobalt adsorbed $\gamma\text{-}Fe_2O_3$.

7. A recording medium according to claim 3, characterized in that said magnetic film contains nonmagnetic particles.

8. A recording medium according to claim 7, characterized in that said nonmagnetic particles are selected from the group of $\alpha\text{-}Fe_2O_3$, $\alpha\text{-}Al_2O_3$ and $SiO_2$.

9. A recording medium according to claim 1, characterized in that a particle diameter of said plane magnetic particles is in the range of 0.1 to 0.3 $\mu$m.

10. A recording medium according to claim 3, characterized in that the size of said other particles is in the range of 0.05 to 0.4 $\mu$m.

* * * * *

UNITED STATES PATENT AND TRADEMARK OFFICE
CERTIFICATE OF CORRECTION

PATENT NO. : 4,746,569
DATED : May 24, 1988
INVENTOR(S) : TAKAHASHI et al.

It is certified that error appears in the above-identified patent and that said Letters Patent is hereby corrected as shown below:

Col. 6
Line 67, delete "was" and insert --were--.

Col. 9
Line 41, delete "MS" and insert --Ms--.

Col. 10
Line 59, delete "the" and insert --an--;
Line 60, delete "being" and insert --is--.

Signed and Sealed this

Twenty-fifth Day of October, 1988

Attest:

DONALD J. QUIGG

Attesting Officer

Commissioner of Patents and Trademarks